United States Patent [19]

Cien et al.

[11] Patent Number: 4,943,021
[45] Date of Patent: Jul. 24, 1990

[54] GUITAR STAND

[76] Inventors: Timothy P. Cien; Emmanuel C. Cien, both of 8431 Paso Iglesia, Spring Valley, Calif. 92077

[21] Appl. No.: 390,291

[22] Filed: Aug. 7, 1989

[51] Int. Cl.⁵ .............................................. F16M 11/00
[52] U.S. Cl. ..................................... 248/167; 84/327; 248/176; 248/434
[58] Field of Search .............. 248/167, 166, 434, 460, 248/464, 176; 211/24; 84/327

[56] References Cited

U.S. PATENT DOCUMENTS

| 1,403,865 | 1/1922 | Pritchett et al. | 248/167 X |
|---|---|---|---|
| 1,612,148 | 12/1926 | Oettinger | 84/327 X |
| 1,673,205 | 6/1928 | Romao | 248/166 X |
| 2,436,298 | 2/1948 | Gunderson | 248/166 X |
| 2,464,031 | 3/1949 | Fiedel | 248/167 |
| 2,552,921 | 5/1951 | Anderson | 248/167 |
| 3,958,786 | 5/1976 | Mann | 84/327 X |
| 4,691,610 | 9/1987 | Gilbert | 84/327 |

Primary Examiner—David L. Talbott
Attorney, Agent, or Firm—Charles C. Logan, II

[57] ABSTRACT

A compact collapsible portable guitar stand that has a rear support leg, a backrest support leg, and a pair of lateral side support legs all of which are pivotally secured to a T hinge assembly. A pair of support arms having upright members on their front ends each have their rear ends pivotally secured to the hinge assembly and they function to support the bottom end of a guitar. All of the support legs and support arms when in their collapsed position are longitudinally aligned with each other.

6 Claims, 1 Drawing Sheet

GUITAR STAND

BACKGROUND OF THE INVENTION

The invention relates to a collapsible portable stand and more specifically to one that is utilized for supporting the guitar of a musician.

When a musician playing his guitar takes a break, the options as to where he can place his guitar are limited. He may lay the guitar down on the floor or other surface. He may place his guitar back into his case. Or, he may use one of the presently available guitar stands.

The present day guitar stands are large and bulky and come in three separate pieces. To use the stand, it is first necessary to assembly the three separate pieces. When the musician is done playing and he is ready to leave with his instrument, it is necessary that he disassemble the stand and that he carry these in some manner.

It is an objective of the invention to provide a novel guitar stand that is lightweight, collapsible and portable.

It is also an object of the invention to provide a novel guitar stand that has all of its components pivotally separated to each other so that no assembly or disassembly is required in order to use or store the guitar stand.

It is another object of the invention to provide a novel collapsible portable guitar stand that is economical to manufacture and market.

It is a further object of the invention to provide a novel collapsible portable guitar stand that is compact enough in its folded state to fit inside the guitar case.

SUMMARY OF THE INVENTION

Applicant's novel guitar stand has been designed to be portable and collapsible. All of its components are pivotally secured to each other so that it is not necessary to assemble the guitar stand prior to it being used and disassembling it after the guitar player is finished playing his instrument. The components are made of light weight metal such as aluminum. It would also be possible to make them from plastic material.

The portable guitar stand has a unique T hinge assembly formed from a rectangularly-shaped top plate member, a triangular-shaped bottom plate member and an elongated hinge pin. An elongated backrest support leg has its bottom end secured to the triangularly-shaped bottom plate member. A rear support leg has its front end secured to the rectangularly-shaped top plate member. A pair of side support legs each have their inner ends pivotally secured to the rectangularly-shaped top plate member. A pair of laterally spaced support arms are also pivotally secured to the rectangularly-shaped top plate member.

In its compact stored state, the guitar stand has its rear support leg stacked on top of the backrest support leg. The respective pairs of side support legs and support arms are also stacked upon each other and aligned longitudinally with the rear support leg on each of its respective opposite lateral sides. The first step in setting up the guitar stand is to take the backrest support leg from its underlying position and pivot it downwardly and upwardly around the front end of the rear support leg to its upright functional position. Next the side support legs have their wingnuts loosened so that these leg members can be pivoted laterally outwardly and at the same time the support arms are pivoted through 180 degrees so that they extend forwardly of the back rest support leg. The wingnuts are then tightened and the guitar stand is ready for use. The procedure for folding the guitar stand back to its collapsed state is merely the reverse of the steps used to set it up.

DESCRIPTION OF THE PREFERRED EMBODIMENT

Figure 1:
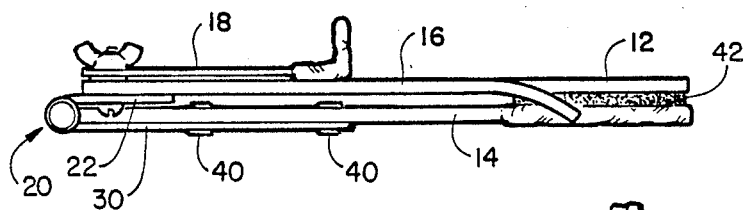
FIG. 1 is a side elevational view of the novel guitar stand in its collapsed state.
Figure 4:
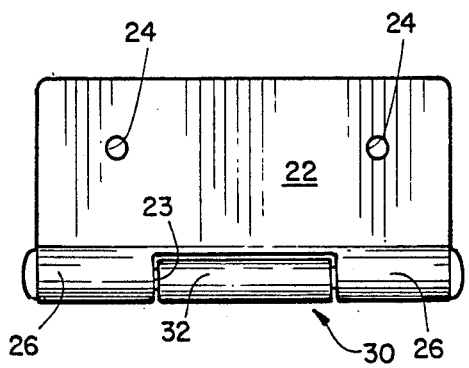
FIG. 4 is a top plan view of the T hinge assembly.
Figure 2:
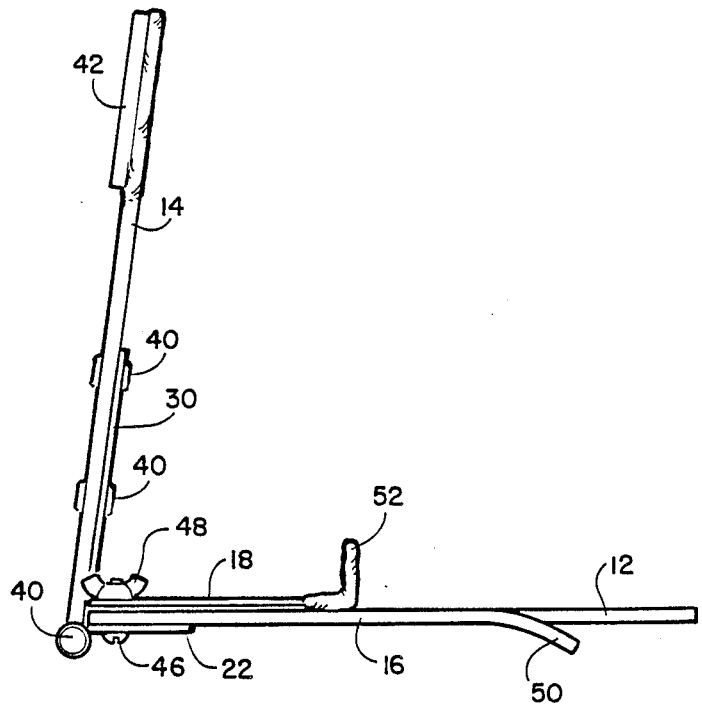
FIG. 2 is a side elevation view of the novel guitar stand after the back rest support leg has been pivoted downwardly and upwardly to its upright position.
Figure 5:
FIG. 5 is a top plan view of the triangular-shaped bottom plate member of the T hinge assembly.
Figure 3:
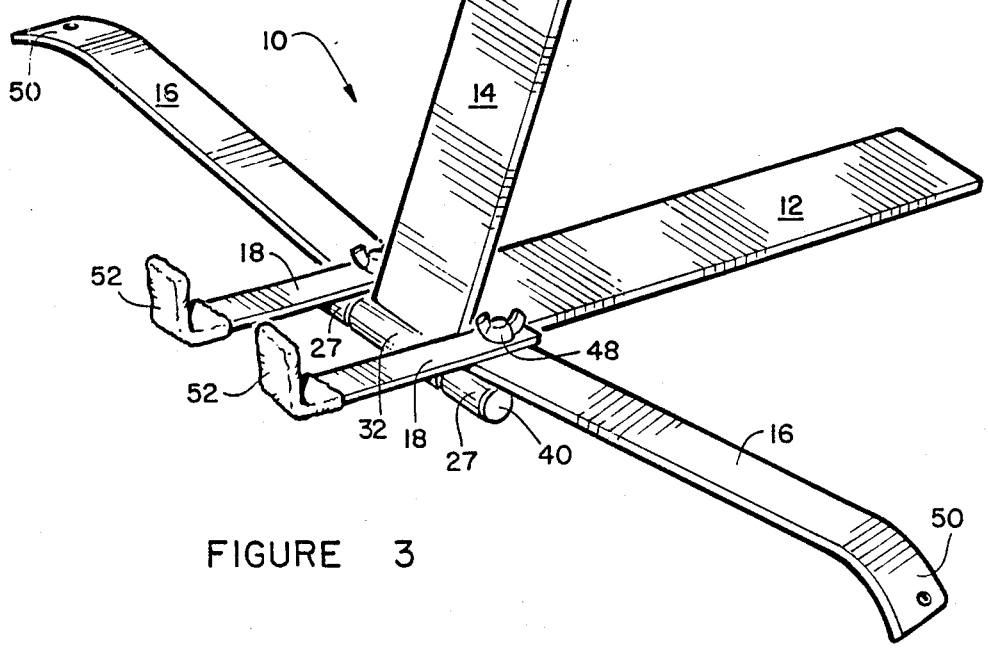
FIG. 3 is a front perspective view illustrating the novel guitar stand in its set up position.

Applicant's novel collapsible portable guitar stand will now be described by referring to FIGS. 1-5 of the drawing. The guitar stand is generally designated numeral 10.

Guitar stand 10 has a rear support leg 12, a backrest support leg 14, a pair of side support legs 16, a pair of support arms 18, and a T hinge assembly 20.

T hinge assembly 20 has a rectangularly-shaped top plate member 22 having a cutout portion 23, and apertures 24, and tubular leg portions 26 and 27. T hinge assembly 20 also has a triangularly-shaped bottom plate member 30 having apertures 31 and a tubular leg portion 32. Tubular leg portion 32 aligns with tubular leg portions 26 and 27 and a pin 40 passes through their aligned bores. Backrest support leg 14 is secured by fastening structure such as rivets 40 to triangularly-shaped bottom plate member 30. A rubber or neoprene cushion member 42 is secured to the top surface of backrest support leg 14 adjacent its top end.

The front end of rear support leg 12 is connected to the underside of rectangularly shaped bottom plate member 22 by conventional fastening means. Support arms 18 and side support legs 16 each have apertures adjacent their one end through which passes a bolt 46 whose top end is received in a wingnut 48.

The outer ends of side support legs 16 have downwardly curved foot portions 50. The front end of support arms 18 have upright members 52.

What is claimed is:

1. A collapsible portable guitar stand comprising:
   an elongated backrest support leg having a top end and a bottom end;
   an elongated rear support leg having a front end and a rear end;
   a pair of elongated side support legs each having an outer end and an inner end;
   hinge means for connecting the bottom end of said backrest support leg to the front end of said rear support leg comprising:
      a top plate member having a first side, a pair of tubular leg portions are formed on said side and a cutout portion is formed between them;
      a bottom plate member has a bottom end having a tubular leg portion formed thereon that mates with said cutout portion; and
      a pin is detachably received in the aligned tubular leg portions of said top plate member and said bottom plate member;
   pivot means for securing the respective inner ends of said side support legs to said top plate member; and support means for the bottom end of a guitar, said support means being pivotally connected to said top plate member.

2. A collapsible portable stand as recited in claim 1 wherein the outer ends of said elongated side support legs each have a downwardly curved foot portion.

3. A collapsible portable guitar stand as recited in claim 1 wherein said backrest support leg, said rear support leg and said side support legs are all formed of flat strips of metal.

4. A collapsible portable guitar stand as recited in claim 1 wherein said support means for the bottom end of a guitar comprises a pair of elongated support arms each having a front end and a rear end, an upright member extends upwardly from the front end of each of said support arms.

5. A collapsible portable guitar stand as recited in claim 4 wherein the rear ends of said support arms are pivotally connected to said hinge means.

6. A collapsible portable guitar stand as recited in claim 1 further comprising a cushion member secured to the top surface of said back rest support leg adjacent its top end.

* * * * *